(12) United States Patent
Jang et al.

(10) Patent No.: US 7,741,810 B2
(45) Date of Patent: Jun. 22, 2010

(54) PORTABLE TERMINAL WITH CRADLE

(75) Inventors: Hwan-Gee Jang, Gumi-si (KR); Byung-Yeol Ko, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 212 days.

(21) Appl. No.: 11/836,363

(22) Filed: Aug. 9, 2007

(65) Prior Publication Data

US 2008/0164843 A1 Jul. 10, 2008

(30) Foreign Application Priority Data

Jan. 8, 2007 (KR) .................. 10-2007-0002025

(51) Int. Cl.
*H02J 7/00* (2006.01)
*H04B 1/38* (2006.01)

(52) U.S. Cl. .................. 320/114; 320/115; 320/107; 455/573

(58) Field of Classification Search .......... 320/103, 320/107, 111, 112, 114, 115; 439/165; 361/625; 455/566, 573, 575.1, 575.8
See application file for complete search history.

(56) References Cited

U.S. PATENT DOCUMENTS

| 7,176,961 | B2 * | 2/2007 | Shimamura | 348/207.99 |
|---|---|---|---|---|
| 7,380,759 | B1 * | 6/2008 | Whiteside et al. | 248/183.1 |
| 2003/0100338 | A1 | 5/2003 | Lee | |
| 2005/0111182 | A1 * | 5/2005 | Lin et al. | 361/686 |
| 2005/0122311 | A1 * | 6/2005 | Lee et al. | 345/158 |
| 2007/0149262 | A1 * | 6/2007 | Navntoft | 455/575.3 |
| 2007/0236180 | A1 * | 10/2007 | Rodgers | 320/115 |
| 2008/0062625 | A1 * | 3/2008 | Batio | 361/680 |
| 2008/0146295 | A1 * | 6/2008 | Jorgensen et al. | 455/575.3 |
| 2008/0253072 | A1 * | 10/2008 | Tracy et al. | 361/681 |

FOREIGN PATENT DOCUMENTS

| KR | 1020030031250 A | * | 4/2003 |
|---|---|---|---|
| KR | 10-2004-0010971 A | | 2/2004 |
| KR | 10-2006-0010166 A | | 2/2005 |
| KR | 10-2005-0038985 A | | 4/2005 |
| KR | 1020050038985 | * | 4/2005 |
| KR | 10-2007-0025960 A | | 3/2007 |

OTHER PUBLICATIONS

Upcoming Samsung SGH-F300 MP3 Phone, Mar. 12, 2006, Part1 (pp. 2-4), Part 2 (p. 2).*

* cited by examiner

*Primary Examiner*—Edward Tso
*Assistant Examiner*—Ahmed Omar
(74) *Attorney, Agent, or Firm*—Jefferson IP Law, LLP

(57) ABSTRACT

A portable terminal with a cradle is provided. The cradle includes a base unit, a cradling unit assembled to one face of the base unit and rotatable about a rotary axis extending perpendicularly to the one face of the base unit, and at least one cover member pivotally connected to the base unit. If the housing of the terminal is mounted on the cradling unit and rotated together with the cradling unit, the front and rear faces of the housing are reversed. The cradle configured in this manner is advantageous in that its cover member can protect the housing of the terminal and improve structural stability of the slim terminal. In addition, because the cover is used as a support in the extended state, a display device can be variously oriented, so that a user can conveniently use a multimedia service such as a broadcast.

15 Claims, 6 Drawing Sheets

PORTABLE TERMINAL WITH CRADLE

PRIORITY

This application claims the benefit under 35 U.S.C. §119 (a) of a Korean patent application filed in the Korean Intellectual Property Office on Jan. 8, 2007 and assigned Serial No. 2007-2025, the entire disclosure of which is hereby incorporated by reference.

BACKGROUND OF THE INVENTION

1. Field of the Invention

The present invention relates to a portable terminal. More particularly, the present invention relates to a cradle for a portable terminal.

2. Description of the Related Art

Typically, a portable terminal may be classified into a bar-type, a flip-type or a folder-type according to the appearance thereof.

A bar-type terminal has a single body housing which is provided with a transmitter unit, a receiver unit, a key pad, a display device and the like. The key pad for serving as a data input unit may be caused to malfunction because it is always exposed. Furthermore, such a bar-type unit has a limit in miniaturization because it is necessary to secure a predetermined distance between the transmitter unit and the receiver unit.

A flip-type terminal includes a body, a flip and a hinge module interconnecting the body and the flip, wherein the body is provided with a transmitter unit, a receiver unit, a key pad, a display device and the like. The key pad for serving as a data input unit can be prevented from malfunctioning because it is closed or opened by the flip. However, such a flip-type unit has a limit in miniaturization because it is necessary to secure a predetermined distance between the transmitter unit and the receiver unit.

A folder-type portable terminal includes a body, a folder and a hinge module rotatably interconnecting the body and the folder, so that the body is opened and closed as the folder rotates. During the standby mode, because the folder comes into close contact with the body, the malfunction of the key pad can be prevented. In the communication mode, the folder is extended, so that a sufficient distance can be secured between the transmitter unit and the receiver unit, which is advantageous in miniaturization.

Recently, sliding-type terminals have become popular as have folder-type terminals. A sliding-type terminal includes a pair of housings which are slidably engaged with each other, so that one of the housings slides in a folded state, thereby opening a part of the other housing. Such a sliding-type terminal is advantageous in that it is convenient to carry and use.

Mobile communication services using these portable terminals were initially limited to voice communication and short messaging services. However, the mobile communication services have been gradually extended from an entertainment service area, such as a game service, a funny picture service, a bell sound service and the like, to a multimedia service area, such as a playing-image service, an Audio On Demand (AOD) service and a Video On Demand (VOD) service. Recently, broadcasting services, such as satellite/terrestrial Digital Multimedia Broadcasting (DMB), have also been provided through portable terminals.

Due to the characteristics of portable terminals, light weight has become an important standard for consumers' selecting of a portable terminal. However, as the multimedia services are becoming popular, the sizes of display devices have been increased. Therefore, efforts for miniaturizing and lightening portable terminals have been concentrated to how to reduce the thicknesses of portable terminals.

However, due to a slim construction, a portable terminal is structurally weakened, and it is very difficult to secure sufficient battery capacity for the portable terminal. Specifically, as the thickness of a portable terminal is reduced, the possibility of deformation, such as flexure, of the portable terminal occurring due to an external force is increased. Furthermore, due to the reduction of the thickness of such a portable terminal, a space for installing components within the terminal is also reduced, which causes the capacity of a battery cell to be reduced.

In addition, since conventional portable terminals have been manufactured in a form convenient for mobile communication functions such as voice communication, short messaging, etc. even though service areas through portable terminals have been variously extended, they have a disadvantage in that they are inconvenient for enjoying diversified services.

SUMMARY OF THE INVENTION

An aspect of the present invention is to address the above-mentioned problems and/or disadvantages and to provide at least the advantages described below. Accordingly, an aspect of the present invention is to provide a portable terminal with a cradle which allows a user to conveniently use diversified service contents, such as a multimedia service and the like.

Another aspect of the present invention is to provide a portable terminal with a cradle, wherein the cradle can compensate the structural weakness of the terminal and increase battery capacity, even if the terminal is slim.

According to an aspect of the present invention, a portable terminal with a cradle is provided. The cradle includes a base unit, a cradling unit assembled to one face of the base unit and rotatable about a rotary axis extending perpendicularly to the one face of the base unit, and at least one cover member pivotally connected to the base unit, wherein if the housing of the terminal is mounted on the cradling unit and rotated together with the cradling unit, the front and rear faces of the housing are reversed.

With the inventive cradle for a portable terminal, a portable terminal is mounted on the cradling unit rotatably assembled to the base unit, and the screen displaying direction of a display device mounted on the terminal can be variously changed by rotating the cradling unit in relation to the base unit. In addition, because the cover member connected to the base unit is folded to the housing of the terminal or extended away from the housing, thereby protecting the terminal and reinforcing the housing of the terminal, even if the housing is slim.

Furthermore, if a separate battery cell is received in the cover member, the cradle itself may be used as an auxiliary power supply for the terminal.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions and configurations will be omitted for clarity and conciseness.

Figure 1:
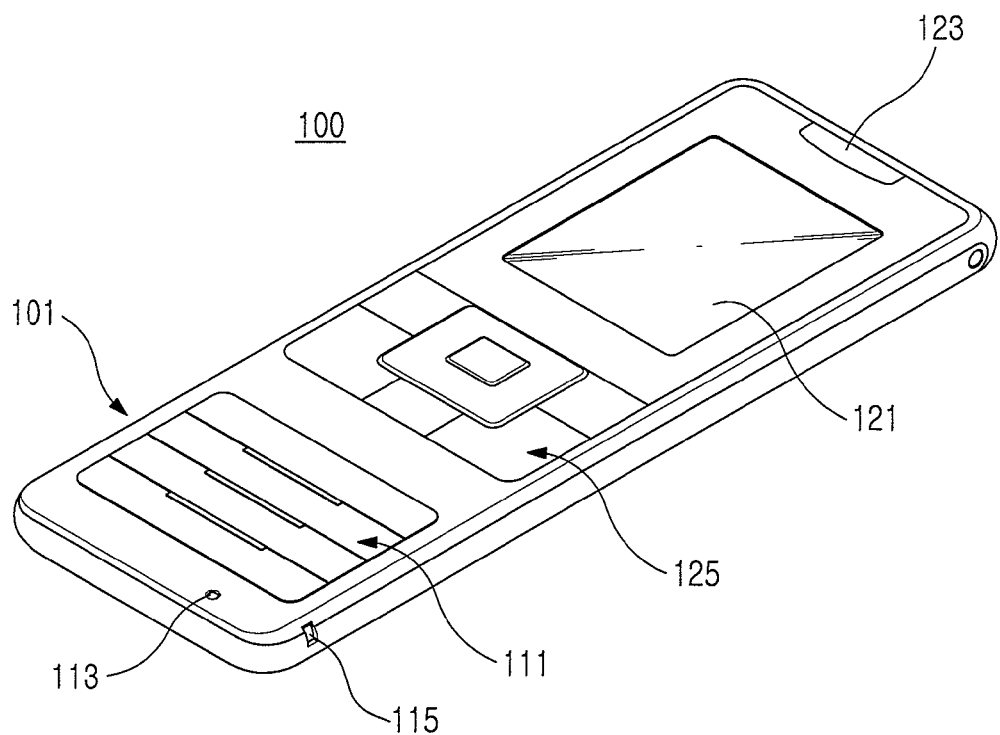
FIG. 1 is a perspective view illustrating a portable terminal to be mounted on a cradle according to an exemplary embodiment of the present invention.
Figure 2:
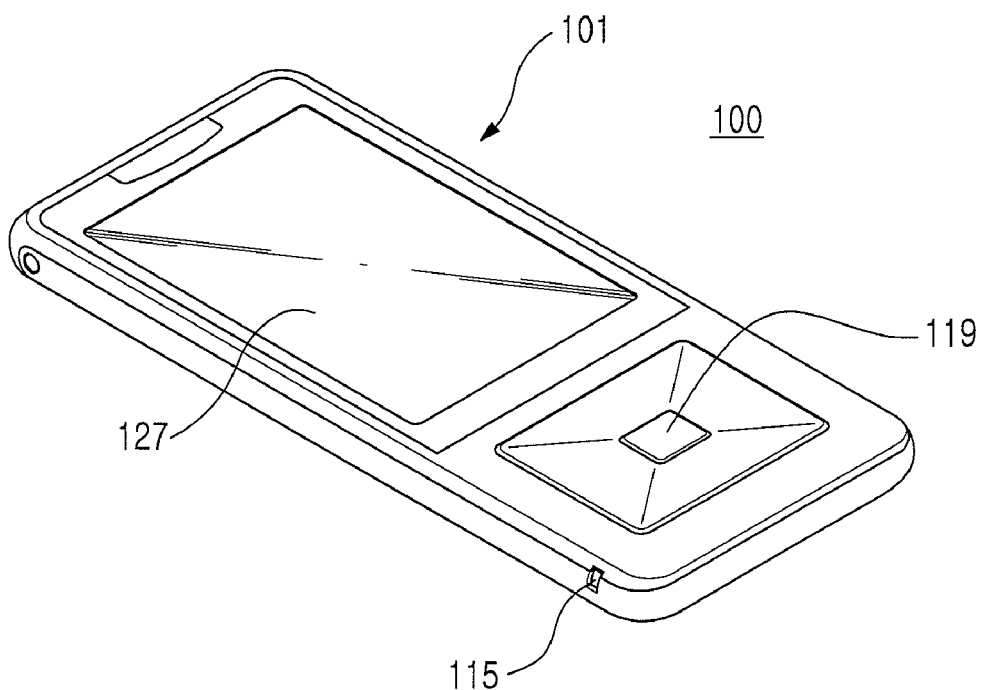
FIG. 2 is a perspective view illustrating the rear side of the portable terminal of FIG. 1.
Figure 3:
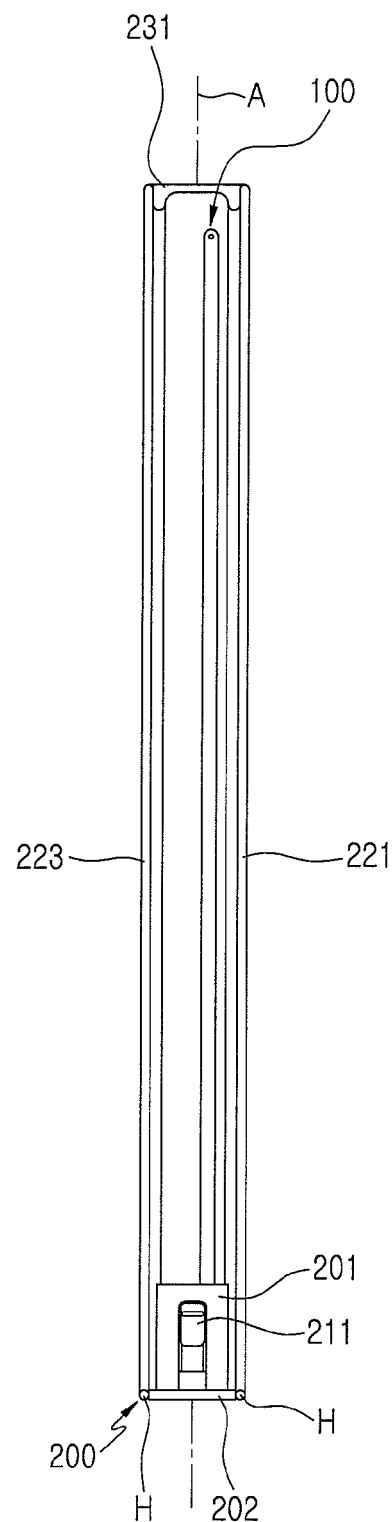
FIG. 3 is a side view illustrating the portable terminal of FIG. 1 mounted on a cradle.
Figure 4:
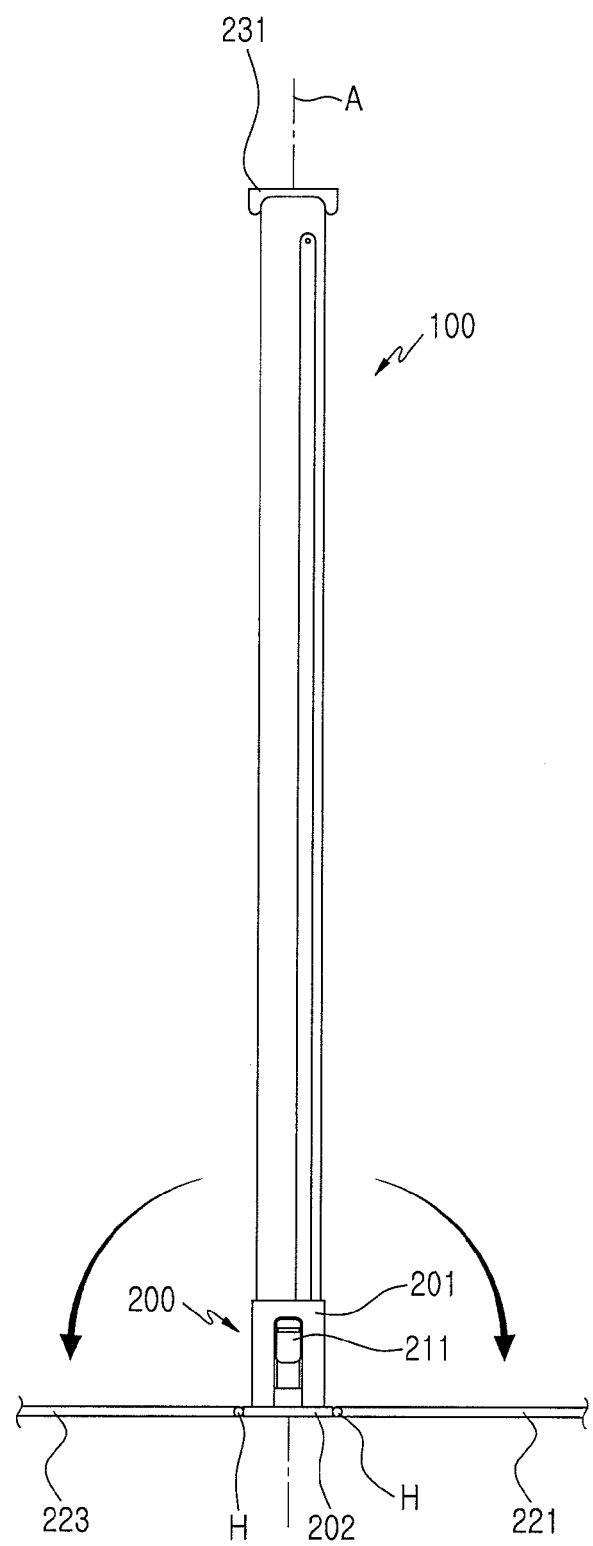
FIG. 4 is a side view illustrating the portable terminal of FIG. 3, wherein the cover members of the cradle are pivoted from the state shown in FIG. 3.
Figure 5:
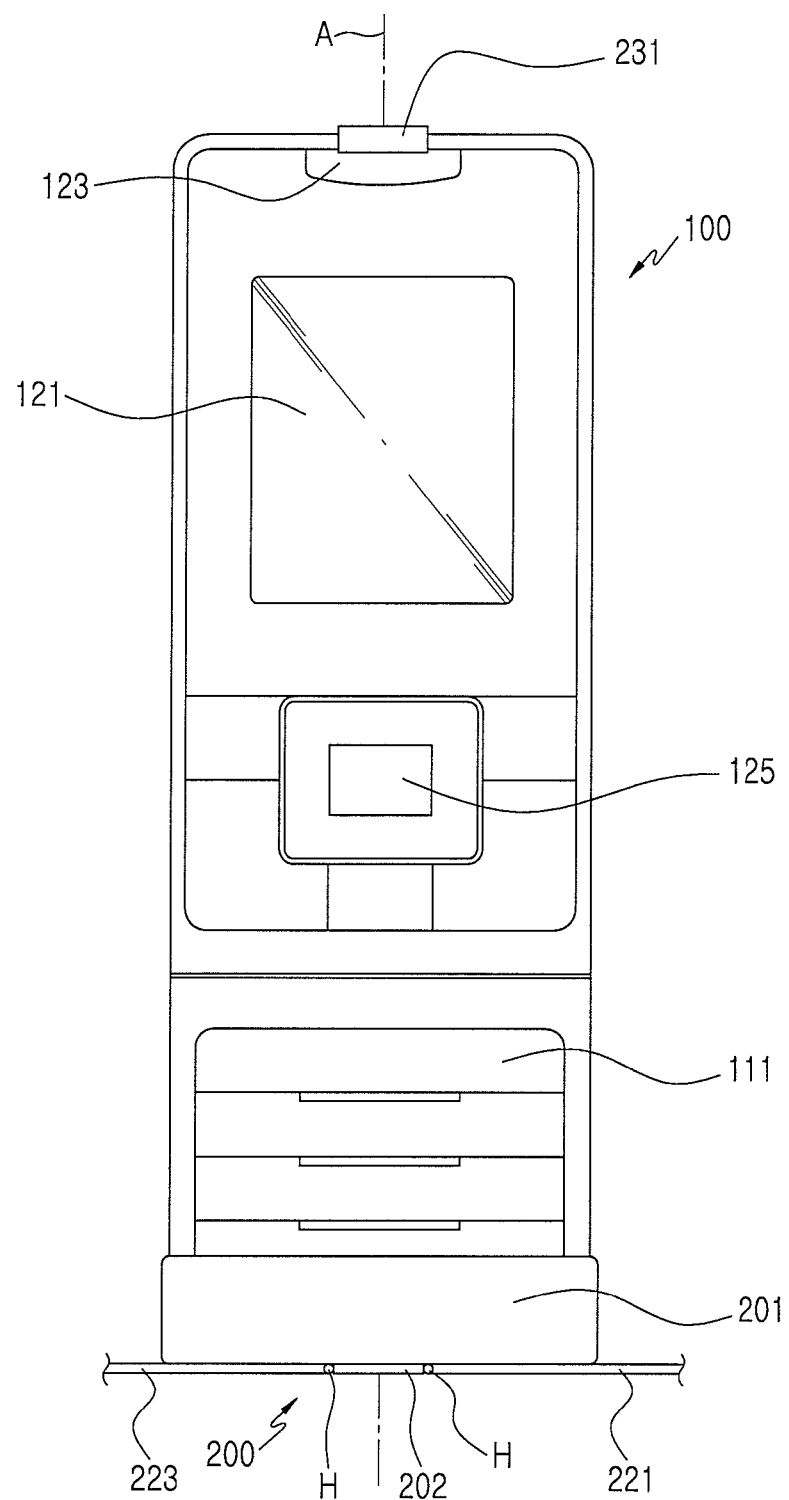
FIG. 5 is a side view illustrating the portable terminal of FIG. 3, wherein the portable terminal is rotated from the state shown in FIG. 4.
Figure 6:
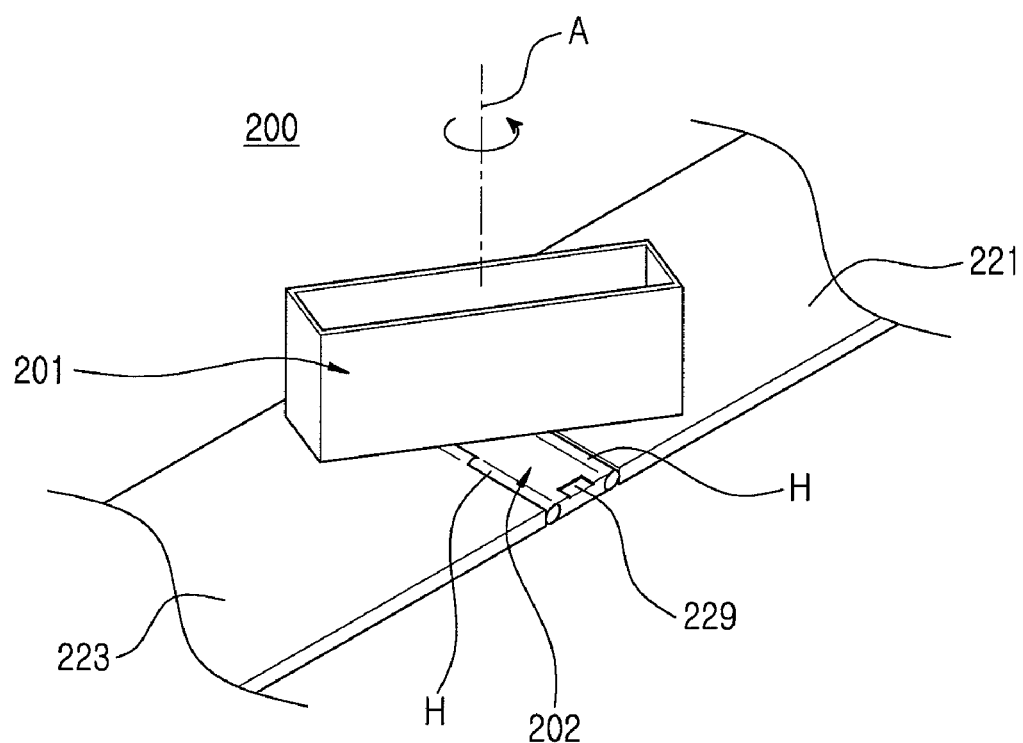
FIG. 6 is a perspective view illustrating the cradle shown in FIG. 3.

As shown in FIGS. 1 and 2, the portable terminal 100 according to an exemplary embodiment of the present invention includes a first functional key pad 119 provided on one face of a housing 101, a character key pad 111 provided on the other face of the housing 101 and a transmitter unit 113. The first functional pad 119 may be used for selecting a channel and controlling volume when watching a broadcast. The character key pad 111 is used for inputting a telephone number or for inputting character information, e.g., for preparing a short message or an email. The transmitter unit 113 is arranged at a side of the character key pad 111.

A second functional key pad 125, a first display device 121 and a receiver unit 123 are sequentially arranged at another side of the character key pad 111, and a second display device 127 is arranged at a side of the first functional key pad 119. The second functional key pad 125 is used for calling or selecting a menu installed within the terminal 100, or for searching information stored in the terminal 100. When the second functional key pad 125 is operated, the user can confirm the operation of the terminal 100 through the first display device 121.

That is, when the second functional key pad 125 is used or the character key pad 111 is used, the operating condition of the terminal 100 according to the user's operation is displayed through the first display device 121.

The second display device 127 is used for watching a broadcast or enjoying a moving image from a multimedia service, wherein the second display device 127 is larger than the first display device 121 but smaller than the housing 101.

Now, a cradle 200 for the terminal 100 will be described with reference to FIGS. 3 to 6. The cradle 200 includes a cradling unit 201 and cover members 221 and 223, which are connected to a base unit 202, respectively. In an exemplary construction, the cover members 221 and 223 may be connected to the opposed ends of the base unit 202, respectively. However, it should be noted that a single cover member 221 or 223 may be provided at one side of the base unit 202. If only one of the cover members 221 and 223 is provided at one side of the base unit 202, any selected one of the front and rear faces of the housing 101 will be retained in the exposed condition.

The cradling unit 201 provides a space for mounting the housing 101, wherein the cradling unit 201 is assembled to the base unit 202 in such a manner as to be rotatable about a rotary axis "A" extending perpendicularly from one face of the base unit 202. The cradling unit 201 has release buttons 211 which are provided at opposed sides of the cradling unit 201, respectively.

Although not shown, a hinge device for providing driving force for rotating the cradling unit 201 may be installed between the cradling unit 201 and the base unit 202. The hinge device includes at least one pair of hinge cams and an elastic member for providing elastic force biasing the hinge cams to come into close contact with each other. The hinge device generates torque with the cam profiles of the hinge cams. The torque generated by the hinge device acts as driving force for rotating the cradling unit 201. The hinge device disclosed in U.S. Patent Application Publication No. 2004/0179330 dated Sep. 16, 2004, which is hereby incorporated by reference, may be employed as the hinge device in an exemplary implementation of the present invention. Of course, because the '330 publication applies the hinge device to a portable wireless terminal, its shape may be slightly modified so as to use it for interconnecting the cradling unit 201 and the base unit 202.

The hinge device according to an exemplary embodiment of the present invention can stop the rotation of the cradling unit 201 at various angles along the cam diagrams of the hinge cams thereof. For example, if peaks and valleys formed on each of the cams are alternately formed in the circumferential direction at 90 degree intervals, the cradling unit 201 will be stopped at the 180 degree interval. If the peaks and valleys are formed at 45 degree intervals, the cradling unit 201 will be stopped at the 90 degree interval. The stopping angle of the cradling unit 201 may be variously set by a manufacturer for respective articles produced by the manufacturer.

If each of the hinge cams is formed with peaks or valleys, the elastic force of the elastic member is converted into torque by the arrangement of the hinge cams. That is, the elastic force of the elastic member allows the peaks of one of the hinge cams to be engaged with the valleys of another hinge cam. If the cradling unit 201 is rotated so that the peaks are disengaged from the valleys, the hinge cams are relatively rotated by the elastic force in the direction for making the peaks and the valleys be engaged with each other. Consequently, the hinge device will generate torque acting in the rotating direction of the cradling unit 201 or in the reverse direction thereof depending on the rotating position of the cradling unit 201.

The construction and action of the hinge device can be well understood from the above-mentioned U.S. Patent Application Publication No. 2004/0179330 by those skilled in the art.

As illustrated in FIGS. 1 and 2, a pair of catch grooves 115 is formed at the opposed lateral faces of the housing, respectively, and a pair of hooks (not shown) are formed within the cradling unit 201 and engaged in the catch grooves 115. If the user operates the release buttons 211 in the state in which the hooks are engaged in the catch grooves 115, the hooks come out of the catch grooves 115. Therefore, in the state in which the housing 101 is assembled with the cradling unit 201, the user can remove the housing 101 from the cradling unit 201 by pushing the release buttons 211.

The cover members 221 and 223 are pivotally connected to the opposed ends of the base unit 201 via the hinge units "H,"

respectively. In the state the housing 101 is assembled with the cradling unit 201, the cover members 221 and 223 are individually folded to or pivoted away from the housing 101.

In this exemplary implementation, the cover members 221 and 223 are shown as if they have a thickness suitable for protecting the opposed faces of the housing. However, if the thickness is increased and one or more battery cells are received by the cover members 221 and 223, the cradle 200 can be used as an auxiliary power supply for the terminal. If a battery cell is received in one or each of the cover members 221 and 223, wiring for supplying power to the terminal 100 extends to the cradling unit 201 by way of the hinge units "H" and the base unit 202. In order to make one or more battery cells be received in the cover members 221 and 223, and to provide power wiring by way of the hinge units "H" and the base unit 202, it is necessary to secure a space for power wiring by increasing the thicknesses and the diameters of the hinge units H and the base unit 202 as well as the cover members 221 and 223.

In order to restrain the cover members 221 and 223 from moving in the state in which they are folded to the housing 101, the housing 101 may be equipped with a holder 231. The holder 231 is formed in a latch structure engaged with the cover members 221 and 223, thereby anchoring the cover members 221 and 223 folded to the housing 101. The holder 231 may be formed from a magnetic material. If the holder 231 is formed from a magnetic material, the cover members 221 and 223 may be fabricated from a material which can react to the attractive force of the magnetic material, thereby attaching to the holder 231.

In order to provide various material feelings, the cover members may be formed from various materials such as leather, synthetic resin, vinyl and the like and if they are formed from a material such as leather which cannot retain a predetermined shape, it is desired to embed a metallic sheet into the material, wherein the metallic sheet may be formed from a material like iron, which is capable of reacting to the magnetic force of a magnetic material, thereby being attached to the magnetic material while retaining the shape of the cover members 221 and 223. That is, if such metallic sheets are embedded within the cover members 221 and 223 formed from leather or the like, the metallic sheets can continuously retain the shape of the cover members 221 and 223. The cover members 221 and 223 can be retained in the state in which they are folded to the housing 101 by the attractive force of the holder 231 formed from a magnetic material.

If the cover members 221 and 223 are folded to the housing 101 in the state in which the bottom end of the housing 101 is mounted on the cradling unit 201, the holder 231 anchors the cover members 221 and 223 at the top end of the housing 101 so that the cover members 221 and 223 can be stably retained in the folded state in relation to the housing 101.

If the cover members 221 and 223 rotate by about 90 degrees from the folded state in relation to the housing 101, thereby being opened, they can act as supports for retaining the housing in the standing state on a flat surface.

If the cradling unit 201 rotates about the rotary axis "A" while the cover members 221 and 223 serve as supports, a user can reverse the front and rear faces of the housing 101 or position the first or second display device 121 or 127, preferably, the second display device 127 at a desired orientation so as to watch a broadcast or the like.

In addition, the user can rotate only the desired one of the cover members so as to open the display device opposed to the corresponding cover member, whereby the user can perform voice communication or selectively use a multimedia service.

It is desirable that the first display device 121 and the second display device 127 are both retained in an off state, or only one of them is turned on, depending on whether the first and second display devices 121 and 127 are opened or closed according to the rotation of the cover members 221 and 223, or whether the housing 101 of the terminal 100 is rotated together with the cradling unit 201, so that unnecessary power consumption can be prevented.

In order to control the on/off operation of the first and second display devices 121 and 127, the terminal may be provided with one or more sensors for detecting whether the cover members 221 and 223 are opened or closed, and whether the cradling unit 201 is rotated.

A hall sensor for detecting whether the terminal is opened or closed in a folder-type terminal or detecting whether the sliding movement is performed or not in a sliding-type terminal may be employed as the sensor. Here, it should be noted that the sensor described in an exemplary embodiment of the present invention is used when the housing 101 of the terminal 100 is mounted on the cradling unit 200, and that it is possible to separately configure means for controlling the on/off operation of the first and second display devices 121 and 127 in the state in which the housing 101 is removed from the cradling unit 200.

At first, a description will be made concerning a construction for detecting whether the first and second display devices 121 and 127 are opened or closed according to the rotation of the cover members 221 and 223, thereby turning on/off the display devices.

Sensors are mounted on the opposed faces of the housing 101 of the terminal, respectively, so as to detect whether the first and second display devices 121 and 127 are opened or closed according to the rotation of the cover members 221 and 223, and a sensor is mounted on the cradling unit 201 or the base unit 202 so as to detect whether the cradling unit 201 is rotated or not.

The sensors can be provided together with the holder 231. With an arrangement provided with hall sensors, it is possible for the hall sensors to detect whether the first and second display devices 121 and 127 are opened or closed even if the hall sensors are arranged at any position on the opposed faces of the housing 101.

If it is detected that the second display device 127, which is mainly used for a multimedia service, is opened, the terminal 100 retains the first display device 121 in the off state and activates the second display device 127. That is, the first display device 121 is retained in the off state when the second display device 127 is in the opened state, regardless of whether the cover members 221 and 223 are rotated or not.

In order to activate the first display device 121, the first display device 121 should be opened while the second display device 127 is closed by one of the cover members 221 and 223. That is, the first display device 121 can be activated, only when the second display device 127 is closed and the first display device 121 is opened.

This is because the first display device 121 is mainly used when a mobile communication service is provided. Because the on/off condition of the display devices of the terminal is controlled as described above, the user can use the terminal 100 in the same manner as conventional terminals in the mobile communication mode.

If it is desired to use a multimedia service, the user may open the second display device 127. Therefore, when the second display device 127 is opened, the first display device 121 is restrained from being activated.

Next, a description will be made concerning a construction in which a sensor is provided between the cradling unit 201 and the base unit 202 so as to control the on/off operation of the first and second display devices 121 and 127.

In an exemplary implementation, a hall sensor 229 may be used as the sensor, which is provided between the cradling unit 201 and the base unit 202. If the hall sensor 229 is mounted on one of the cradling unit 201 and the base unit 202, the other may serve as an object to be detected by the hall sensor 229.

In an exemplary construction, the hall sensor 229 may be mounted on the base unit 202 at one end thereof, and a magnetic member (not shown) may be mounted on the cradling unit 201 at one end thereof so as to be used as an object to be detected by the hall sensor 229. At this time, the hall sensor 229 retains the second display device 127 in the off state when it is opposed to the magnetic member mounted on the cradling unit 201, and if the cradling unit 201 rotates and the magnetic member gets away from the opposed state in relation to the hall sensor 229, the hall sensor 229 turns on the second display device 127 while retaining the first display device 121 in the off state.

That is, only when the magnetic member is opposed to the hall sensor 229, the first display device 121 can be activated. At this time, in order to detect whether the first display device 121 is closed by one of the cover members 221 and 223, as an exemplary implementation, a separate sensor may be mounted on the face where the first display device 121 is installed. As such, if the first display device 121 is closed by one of the cover members 221 and 223 even though the magnetic member is opposed to the hall sensor 229, the first display device 121 is retained in the off state.

If it is detected that the magnetic member gets away from the opposed state in relation to the hall sensor 229, the terminal determines that it is used for a multimedia service, and sets the first display device 121 to the off state while activating the second display device.

At this time, a means for detecting whether the second display device 127 is opened or closed may be separately provided. However, because all the first and second display devices 121 and 127 should be opened in order for the cradling unit 201 to be rotated, it is not necessary to provide the means for detecting whether the second display device 127 is opened or closed. That is, by detecting whether the cradling unit 201 rotates or not, it can be determined whether to activate the second display device 127 or not.

Consequently, if detecting means such as a hall sensor 229 is provided between the cradling unit 201 and the base unit 202, the terminal 100 controls the on/off state of the first and second display devices 121 and 127 depending on whether the cradling unit 201 rotates or not. That is, activating the first display device 121 is allowed only when the first display device 121 is opened in the state in which the hall sensor 229 is opposed to the magnetic member of the cradling unit 201, and activating the second display device 127 is allowed when the cradling unit 201 rotates so that the magnetic member gets away from the opposed state in relation to the hall sensor.

Meanwhile, the hall sensor 229 is not necessarily mounted on the base unit 202 and may be mounted on the cradling unit 201. If the hall sensor 229 is mounted on the cradling unit 201, the magnetic member to be detected by the hall sensor 229 should be mounted on the base unit 202.

As described above, a portable terminal with the inventive cradle has advantages in that cover members protect the terminal and improve the structural stability of the terminal, even if the terminal is slim. In addition, because it is possible to make a display device be variously oriented by using the cover members in the extended state, the portable terminal has an advantage in that multimedia services, such as broadcast, can be conveniently used.

In addition, if one or more battery cells are received in the cover members of the cradle, the cradle itself can serve as an auxiliary power supply for the terminal when the user stays outdoors for a long time. As a result, there is an advantage in that it is possible to secure sufficient power, even if the terminal is slim.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A cradle for a portable terminal, the cradle comprising:
   a base unit;
   a cradling unit assembled directly to one side of the base unit for mounting a housing of the portable terminal and for rotating the portable terminal about a rotary axis extending perpendicularly to the one side of the base unit to reverse a front face and a rear face of the housing in order to view one of the front face and the rear face of the housing according to a rotating position of the cradling unit;
   at least one cover member pivotally connected to the base unit for at least one of opening and closing one of the first face and the rear face;
   a first display device mounted on the front face of the housing:
   a second display device mounted on the rear face of the housing, the second display device being larger than the first display device; and
   sensors for detecting whether the first display device and the second display device are one of opened and closed.

2. The cradle as claimed in claim 1, wherein at least one of the front face and the rear face of the housing is opened as the cover member is rotated.

3. The cradle as claimed in claim 1, further comprising another cover member, wherein the cover members are connected to opposed ends of the base unit to at least one of open and close the first face and the rear face of the housing, respectively.

4. The cradle as claimed in claim 1, wherein the portable terminal comprises a first display device and a second display device mounted on the front face and the rear face of the housing, respectively.

5. The cradle as claimed in claim 1, wherein, when the housing is mounted on the cradling unit, the at least one cover member is at least one of folded to the housing and pivoted away from the housing.

6. The cradle as claimed in claim 5, further comprising a holder removably mounted on top of the housing, wherein the at least one cover member is folded to the housing in a state in which the housing is mounted on the cradling unit and anchored by the holder.

7. The cradle as claimed in claim 6, wherein the holder comprises a magnetic material.

8. The cradle as claimed in claim 1, further comprising:
   a battery cell received in the at least one cover member; and
   power wiring extending from the at least one cover member and connected to the cradling unit.

9. The cradle as claimed in claim 1, further comprising a hinge device for interconnecting the base unit and the cradling unit, and for providing torque for acting in one of a first rotational direction and a second rotational direction, according to the rotating position of the cradling unit.

10. The cradle as claimed in claim 1, wherein, if it is detected that the second display device is opened, the first display device is retained in an off state and the second display device is activated.

11. The cradle as claimed in claim 1, wherein, if it is detected that the second display device is closed and the first display device is opened, the second display device is retained in an off state and the first display device is activated.

12. A cradle for a portable terminal, the cradle comprising:
a base unit;
a cradling unit assembled directly to one side of the base unit for mounting a housing of the portable terminal and for rotating the portable terminal about a rotary axis extending perpendicularly to the one side of the base unit to reverse a front face and a rear face of the housing in order to view one of the front face and the rear face of the housing according to a rotating position of the cradling unit;
at least one cover member pivotally connected to the base unit for at least one of opening and closing one of the first face and the rear face;
a detecting means provided between the base unit and the cradling unit to detect whether the cradling unit is rotated;
a first display device mounted on the front face of the housing; and
a second display device mounted on the rear face of the housing, the second display device being larger than the first display device,
wherein, the detecting means comprises a hall sensor mounted at an end of one of the base unit and the cradling unit, and a magnetic member mounted at an end of one of the base unit and the cradling unit not comprising the hall sensor, and if the cradling unit rotates so that the hall sensor and the magnetic member are not opposed to each other, the first display device is retained in an off state and the second display device is activated.

13. A cradle for a portable terminal, the cradle comprising:
a base unit;
a cradling unit assembled directly to one side of the base unit for mounting a housing of the portable terminal and for rotating the portable terminal about a rotary axis extending perpendicularly to the one side of the base unit to reverse a front face and a rear face of the housing in order to view one of the front face and the rear face of the housing according to a rotating position of the cradling unit;
at least one cover member pivotally connected to the base unit for at least one of opening and closing one of the first face and the rear face;
a detecting means provided between the base unit and the cradling unit to detect whether the cradling unit is rotated;
a first display device mounted on a front face of the housing;
a second display device mounted on the rear face of the housing, the second display device being larger than the first display device; and
a second detecting means for detecting whether the first display device is one of opened and closed,
wherein the detecting means comprises a hail sensor mounted at an end of one of the base unit and the cradling unit, and a magnetic member mounted at an end of one of the base unit and the cradling unit not comprising the hall sensor.

14. The cradle as claimed in claim 13, wherein the second display device is retained in an off state when the hall sensor and the magnetic member are opposed to each other.

15. The cradle as claimed in claim 13, wherein when the hall sensor and the magnetic member are opposed to each other, the second display device is retained in an off state, and when the hall sensor and the magnetic member are opposed to each other and the first display device is opened, the first display device is activated.

\* \* \* \* \*